US008448760B1

(12) United States Patent
Houtsma

(10) Patent No.: US 8,448,760 B1
(45) Date of Patent: May 28, 2013

(54) PROGRESSIVELY DAMPENED HYDRAULIC BUFFER SYSTEM

(75) Inventor: Gary J. Houtsma, Denville, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 1265 days.

(21) Appl. No.: 11/900,136

(22) Filed: Aug. 30, 2007

(51) Int. Cl.
*F16F 9/48* (2006.01)

(52) U.S. Cl.
USPC ........... 188/284; 188/286; 188/288; 188/315; 188/316; 267/217; 267/221; 267/226

(58) Field of Classification Search
USPC .................. 188/286, 288, 315, 316; 267/217, 267/221, 226
See application file for complete search history.

(56) References Cited

U.S. PATENT DOCUMENTS

| 887,045 | A | * | 5/1908 | Koch et al. | 89/43.01 |
|---|---|---|---|---|---|
| 1,214,719 | A | * | 2/1917 | Slattery | 188/288 |
| 1,261,011 | A | * | 4/1918 | Cook | 188/288 |
| 1,650,742 | A | * | 11/1927 | Rowan | 267/225 |
| 2,237,318 | A | * | 4/1941 | Snyder | 188/129 |
| 2,714,429 | A | * | 8/1955 | Etherton | 188/281 |
| 5,170,866 | A | * | 12/1992 | Ghaem | 188/267.1 |
| 5,715,681 | A | * | 2/1998 | Williamson | 60/585 |

* cited by examiner

*Primary Examiner* — Bradley King
*Assistant Examiner* — Mahbubur Rashid
(74) *Attorney, Agent, or Firm* — Michael L. Sachs

(57) ABSTRACT

A buffering, energy absorbing, system has tapered grooves within either the inner surface of a cylindrical main body or along the sides of a piston head to allow fluid flow, where the tapered grooves increasingly or decreasingly restrict the flow of fluid between the inside of the main body and an accumulator.

1 Claim, 2 Drawing Sheets

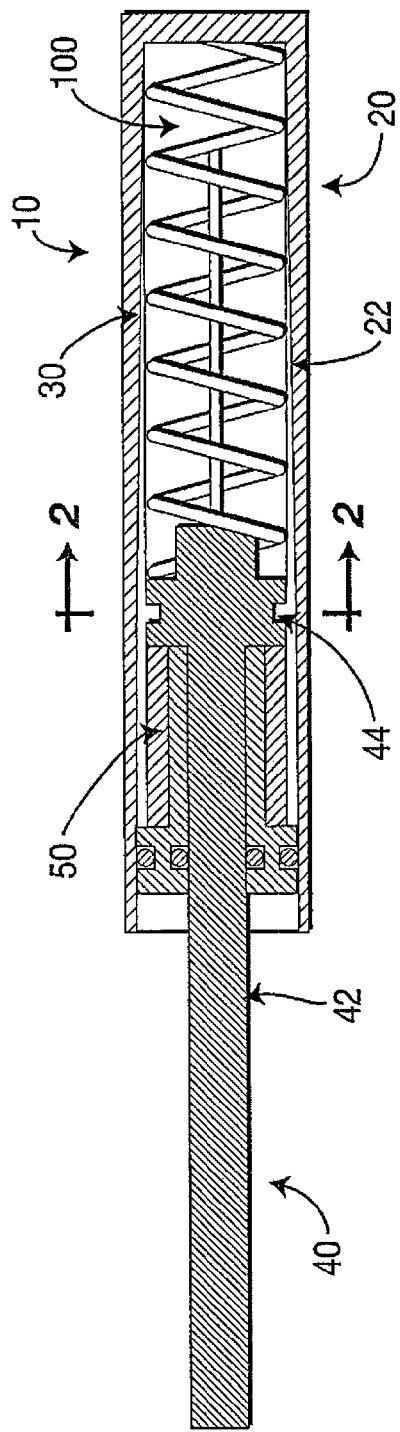
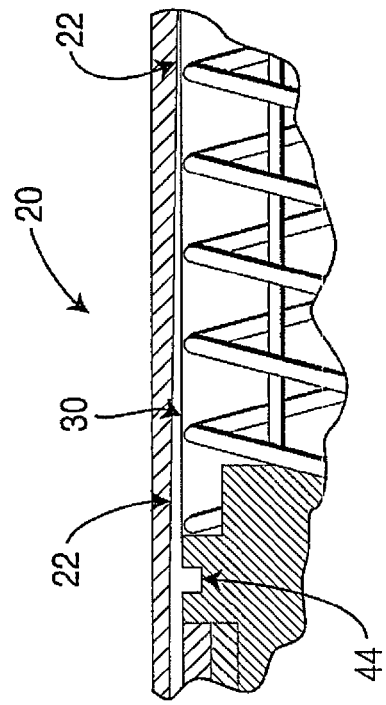
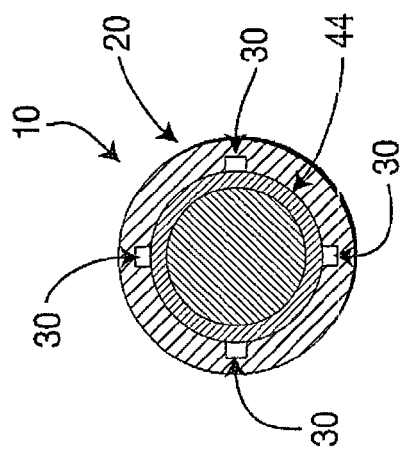

PROGRESSIVELY DAMPENED HYDRAULIC BUFFER SYSTEM

GOVERNMENT INTEREST

The inventions described herein may be manufactured, used and licensed by or for the U.S. Government for U.S. Government purposes.

BACKGROUND OF THE INVENTION

This present invention relates to a hydraulic buffering system, or energy absorbing system, using grooves to provide varying restriction flow of fluid.

Progressive buffers are known that have an outer cylinder and inner cylinder, with the inner cylinder attached to the center of the outer cylinder. The inner cylinder has a pattern of holes drilled from the top of the cylinder body to the bottom. As a piston head travels past the hole pattern fluid is forced though the holes. The fluid then travels between the inner and outer cylinder to an accumulation area on the backside of the piston. Transit of the piston decreases the number of holes which limits the rate that fluid can pass into the accumulator to create the buffer system.

Also known are cone-shaped single cylinder buffers having both the cylinder and the piston tapered. As the piston travels down the cylinder in these systems, fluid is forced around the outside diameter of the piston. The further the piston travels down the cylinder, the more the area around the piston head decreases, causing an increase in resistance to the movement of the piston. Minor changes in the diameter of the cylinder and the piston create large changes in amount of area in which the flow may pass from the front of the piston head to the accumulation area, causing problems of controlling tolerances in these systems and problems of maintaining slope locations.

There is a need for improved dampened hydraulic buffering systems. The present invention addresses this and other needs.

SUMMARY OF THE INVENTION

The present invention includes a buffering system having a cylindrical main body and a piston rod assembly where either the inner surface of the main body or piston head of the piston rod assembly forms at least one groove along the length therein, wherein the at least one formed groove is capable of providing increasingly or decreasingly restricted flow of fluid out of the main body. The piston rod assembly has a seal which forces the fluid to travel though the grooves only. The piston rod assembly is capable of movement along the inner surface within the main body and an accumulator capable of receiving fluid from, and communicating fluid into, the formed grooves within the inner surface of the main body. These formed grooves may include a constant taper, stepped taper, or combinations of the constant taper and stepped taper, with the stepped taper preferred for buffering systems designed to provide precise damping in a desired amount of piston travel.

The present invention also includes a method for damping hydraulic buffering systems comprising one or more tapered grooves solely within the piston head and a cylindrical shoulder in the main body, wherein as the piston head travels into the main body the tapered groove passes the shoulder which creates a decrease in area through which the fluid may pass.

The present invention also includes a method for damping hydraulic buffering systems comprising the steps of providing an energy absorbing system having a cylindrical main body having an inner surface and piston head assembly having a piston head, wherein one of the inner surface or piston head forms at least one groove therein that is capable of providing increasingly or decreasingly restricted flow of fluid out of the main body, the piston rod assembly capable of movement along the inner surface within the main body and an accumulator capable of receiving fluid from and communicating fluid into, the formed grooves, and moving the piston rod assembly along the length of the main body, wherein the rate of movement of the piston rod assembly decreases as the piston rod assembly transits along the length of the main body.

DETAILED DESCRIPTION OF THE DRAWINGS

FIG. 1 illustrates a side view of the hydraulic buffering system of the present invention;

FIG. 2 illustrates an end view of the hydraulic buffering system shown in FIG. 1;

FIG. 3 illustrates a detailed view of the grooves of the hydraulic buffering system shown in FIG. 1;

DETAILED DESCRIPTION OF THE PREFERRED EMBODIMENT

Figure 4:
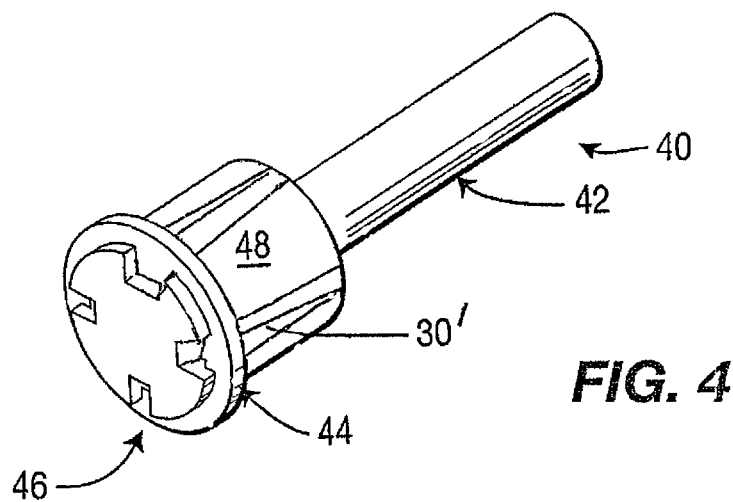
FIG. 4 illustrates the embodiment of the present invention having grooves formed within the length of the piston head; and, FIGS. 5A and 5B illustrate the embodiment of the present invention having tapered grooves.

The present invention provides a novel system for, and method of, damping hydraulic buffers.

As seen in side view illustration in FIG. 1, the hydraulic buffering system 10 of the present invention includes a cylindrical main body 20 having an inner surface 22 forming at least one groove 30 therein. Within the main body 20, a piston rod assembly 40 is integrated in a manner to permit a piston rod 42 to move along the inner surface 22 within the main body 20. An accumulator 50 receives the fluid from, and communicates the fluid into, the formed grooves 30 within the inner surface 22 of the main body 20. For the purposes of the present invention, fluids useful herein include gases such as ambient air, specialized gases and/or inert gases, such as argon or nitrogen, with inert gases preferred.

Preferably the main body 20 of the present invention contains the piston rod assembly 40 formed together with hydraulic accumulators 50 for use in gun systems 10. Preferably the accumulator 50 is at least partially surrounded by the outer cylindrical wall of the main body 20. Most preferably, the accumulator 50 is totally encased within the main body 20. With the accumulator 50 integrated into the main body 20, the outer diameter of the accumulator 50 decreases as the length of cylinder wall covered increases. As such, the main body 20 typically comprises a single cylinder configuration, with the accumulator 50 is preferably located within a portion of the main body 20, typically with the inner surface 22 of the main body 20 forming the walls of the accumulator 50.

The accumulator 50 operates in conjunction with the piston rod assembly 40, with the piston rod 42 slowing as it reaches the end of travel during an extension of the hydraulic cylinder. The tapered grooves 30 provide a cushioning of the movement of the piston rod 42 that minimizes the risk of shock loading from the piston rod 42 suddenly slamming into the end wall of the accumulator 50 at the end of stroke of the piston rod 42. Depending on the configuration, and therefore the methodology, of the hydraulic buffering system 10, the tapered grooves 30 may increase the rate of fluid flow, or may decrease the rate of fluid flow, to slow the rate of transit of the piston rod 42.

The piston rod assembly 40 may further incorporate a sealing element O-ring 44 for sealing the area between the piston rod assembly 40 and the inner surface 22 of the main body 20. The piston rod 42 generally includes a piston ring disk 46 outfitted with the O-ring 44. The O-ring 44 slidably seals the interfaces between the cylinder inner surface of the main body 20 and the piston ring disk 46. Preferred compositions of the O-ring 44 include polytetrafluoroethylene (PTFE) or other similar compositions.

Referring to FIGS. 1-3, the groove, or grooves, 30 formed within the inner surface 22 provides increasingly or decreasingly restricted flow of fluid out of the main body 20. As further seen in the end view illustration of the hydraulic buffering system of FIG. 2, and the detailed view of FIG. 3, the one or more grooves 30 are present in the inner surface 22 of the main body 20. In FIG. 1, 144 shows a groove; in FIG. 2, 244 shows a piston, and; in FIG. 3, 344 shows a groove (like 144 of FIG. 1). The hydraulic buffering system 10 preferably includes a plurality of grooves 30, such as from about two grooves to about eight grooves, more preferably from about four grooves to about six grooves, and most preferably four grooves. The grooves 30 are progressively tapered along the length of the main body 20, and preferably end prior to reaching the end of the main body 20.

The progressively tapered grooves 30 may become increasingly less deep or increase in depth along the length of the main body 20 and/or may become increasingly less wide along the length of the main body 20. Preferably the grooves 30 become increasingly less wide along the length of the main body 20, and more preferably the grooves 30 become both increasingly less wide and less deep along the length of the main body 20. Representative tapering of the grooves 30 includes, for example without limitation, constant slopes (for width and/or depth) originating at a space of $\frac{1}{8}^{th}$ of an inch and tapering to an end point at a distant of two feet, and other similar configurations. The progressively tapered grooves 30 terminate at a location along the length of the main body 20 where the piston rod 42 ceases movement within the main body 20. This termination point is generally prior to the end of the main body 20 to prohibit physical contact of the piston rod assembly 40 with the main body 20, as physical contact between the piston rod assembly 40 and main body 20 greatly increases the chance of catastrophic failure of the buffering system 10. Representative lengths of the tapered grooves 30 include, for example without limitation, from about 30% of the length of the inner surface of the main body 20 to about 90%, more preferably from about 50% to about 85%, and most preferably from about 65% to about 85%. The tapered grooves 30 preferably end within the inner surface of the main body 20 at least ¾ths of an inch away from the end of main body 20, with representative distances being about ¼ inch, ½ inch, 1 inch, and other such appropriate distances, in between and outside of, determinable by one skilled in the art of gun buffering systems.

Referring again to FIG. 1, as the piston rod 42 progresses along the length of the main body 20, the volume of hydraulic fluid becomes increasingly restricted as the tapered grooves 30 diminish the amount of available hydraulic fluid to transit into the accumulator 50 because of the decreased area of the grooves 30. In operation, the accumulator 50 is filled with a hydraulic fluid. The piston rod assembly 40 becomes extended as hydraulic fluid enters the main body 20 under sufficient pressure through the tapered grooves 30. As the hydraulic cylinder assembly extends, the piston rod 42 moves toward the accumulator 50 and the pressure decreases as stored energy is released. The hydraulic cylinder assembly is retracted as hydraulic fluid enters the main body 20 under sufficient pressure. As the piston rod retracts, the hydraulic fluid enters into the main body 20. As the piston rod nears the end of travel toward the end of the main body 20, a progressive restriction of the opening slows the flow of hydraulic fluid and creates a cushioning effect by providing a greater resistance to movement of the piston rod 42 and, thus, slowing the travel rate of the piston rod 42 as it nears the end wall of the cylindrical main body 20. This arrangement reduces the risk of shock loading from the piston rod 42 colliding into the end wall of the main body 20.

As seen in FIG. 4, grooves $30^1$ formed along the length of the piston head provide fluid flow control within the buffering system 10. When present on the piston head 48, additional grooves are not present in the inner surface of the main body. The grooves $30^1$ extend the full length of the piston head 48, and are tapered, by width and/or depth, along a given direction.

Figure 5A:
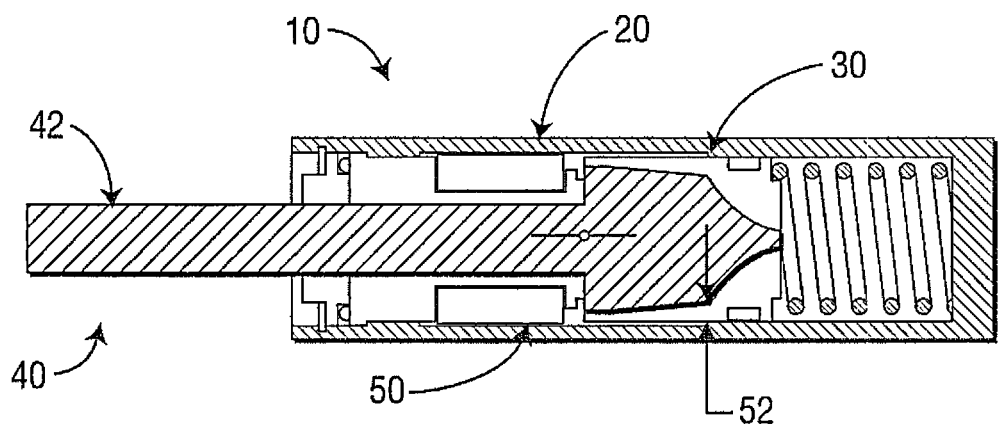
Figure 5B:
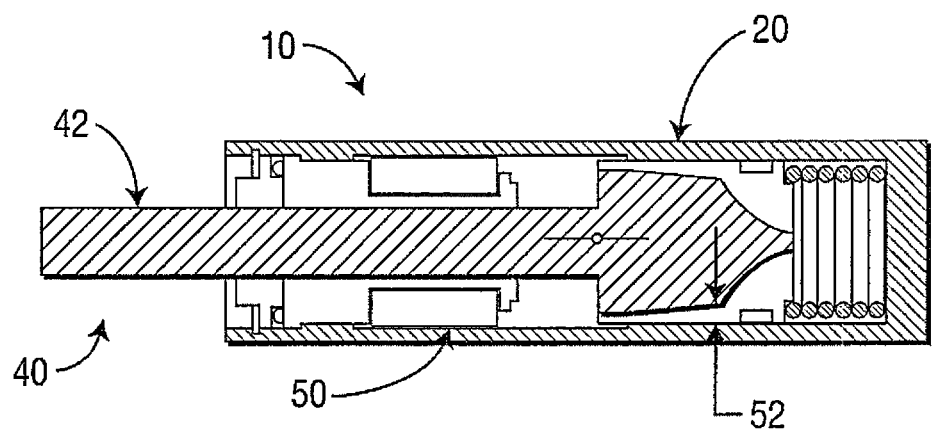

As seen in FIGS. 5A and 5B, in one preferred embodiment the grooves 30 are tapered in a stepped configuration to provide distinct restrictions of fluid flow at given locations of movement of the piston head 48 along the length of the inner surface of the main body. In this embodiment, the hydraulic buffering system 10 includes one or more tapered grooves $30^1$ within the piston head 48 (which are absent from the inner surface of the main body), and a cylindrical shoulder in the main body 20. As the piston head 48 travels into the main body 20, the tapered groove $30^1$ passes the shoulder which creates a decrease in area, shown at 52, through which the fluid may pass. As seen in FIG. 5A, a maximum flow restriction area is created, and a minimum restriction area is shown in FIG. 5B. These stepped grooves are formed in configurations to maximize the benefit of the fluid flow restriction at these given locations, with the proper size and location of the steps determinable by those skilled in the art for a particular purpose and/or effect.

The hydraulic buffering system 10 is particularly useful in gun firing systems, providing significant energy absorbing buffering capability. In operation, the hydraulic buffering system 10 dampens the recoil of a gun with the firing of a projectile. With the firing of the projectile, the piston rod moves along the length of the main body and becomes increasingly impeded, with a decreasing rate of movement as the piston rod assembly transits along the length of the main body. Impedance occurs with restricted flow of fluid through the tapered area of the grooves 30. Operation of the hydraulic buffering system 10 typically includes the step of stopping the movement of the piston rod once the piston rod transits to a length of the main body 20 not forming grooves 30 in fluid communication with the accumulator 50.

Example 1

Prophetic

A 5 inch gun buffer system has a tapered groove buffering system with 4 tapered grooves extending 1.00 inches along the length of the main body of the buffering system. The tapered grooves end 4.00 inches from the end of the main body. The grooves are tapered along the width of the grooves, having a tapered slope of 4 Degrees.

Example 2

Prophetic

A 12 inch gun buffer system has a tapered groove buffering system with 2 tapered grooves extending 6 inches along the length of the main body of the buffering system. The tapered grooves end 6 inches from the end of the main body. The grooves are tapered along the depth of the grooves, having a tapered slope of 0 degrees 30 minutes.

Example 3

Prophetic

A four inch gun system has a tapered groove buffering system with 2 tapered grooves extending 0.625 inches along the length of the main body of the buffering system. The tapered grooves end 4.35 inches from the end of the main body. The grooves are tapered along the width of the grooves, having a tapered slope of 5 degrees.

Example 4

Prophetic

A recoil buffer system has either a set of a tapered grooves or as few as one in the piston head tapered grooves extending along its entire length or a specified length as required for a particular application for absorbing energy.

The foregoing summary, description, and examples of the present invention are not intended to be limiting, but are only exemplary of the inventive features that are defined in the claims. Alternative materials and configurations as those described herein for the present invention may be used.

What is claimed is:

1. A hydraulic buffering system for an automatic fired weapon, comprising:
    a cylindrical main body having an inner surface;
    a piston rod assembly, having a piston head thereto, capable of movement along the inner surface within the main body, the piston head having a sealing mechanism effective to seal the piston head to the inner surface of the cylindrical main body; and,
    an accumulator capable of receiving fluid from, and communicating fluid into, the formed grooves within the inner surface of the main body,
    wherein the piston head forms at least one groove on the outside surface thereof, progressively width tapered along the length of the piston head, the at least one formed groove capable of providing increasingly or decreasingly restricted flow of fluid out of the main body, wherein the progressively tapered groove becomes increasingly less deep along the length of the piston head.

* * * * *